United States Patent
Chommeloux et al.

(10) Patent No.: US 8,299,679 B2
(45) Date of Patent: Oct. 30, 2012

(54) SURFACE-WAVE PASSIVE SENSOR INCLUDING AN INTEGRATED ANTENNA, AND MEDICAL APPLICATIONS USING SUCH A TYPE OF PASSIVE SENSOR

(75) Inventors: Luc Chommeloux, Le Cannet (FR); Brahim Belgacem, Besancon (FR); Jean-François Leguen, Valbonne (FR); Sylvain Ballandras, Besancon (FR); Ali Chami, Nice (FR); Philippe Lethuc, Grasse (FR); Cyril Luxey, Mougins (FR); Robert Staraj, Saint-Paul (FR)

(73) Assignee: Senseor (FR)

(*) Notice: Subject to any disclaimer, the term of this patent is extended or adjusted under 35 U.S.C. 154(b) by 0 days.

(21) Appl. No.: 12/809,992

(22) PCT Filed: Dec. 18, 2008

(86) PCT No.: PCT/EP2008/067944
§ 371 (c)(1),
(2), (4) Date: Sep. 17, 2010

(87) PCT Pub. No.: WO2009/083484
PCT Pub. Date: Jul. 9, 2009

(65) Prior Publication Data
US 2011/0012477 A1 Jan. 20, 2011

(30) Foreign Application Priority Data
Dec. 21, 2007 (FR) .................................... 07 60270

(51) Int. Cl.
*H03H 9/25* (2006.01)
(52) U.S. Cl. ............. 310/313 R; 310/313 B; 310/313 D

(58) Field of Classification Search ... 310/313 A–313 D, 310/313 R, 338
See application file for complete search history.

(56) References Cited

U.S. PATENT DOCUMENTS

| | | | |
|---|---|---|---|
| 6,316,861 B1 | 11/2001 | Ballandras et al. | |
| 7,126,251 B2 | 10/2006 | Solal et al. | |
| 7,369,014 B1 * | 5/2008 | Fehsenfeld et al. | 333/193 |
| 2002/0135270 A1 | 9/2002 | Ballandras et al. | |
| 2005/0062364 A1 * | 3/2005 | Van Der Knokke | 310/313 D |
| 2005/0242961 A1 * | 11/2005 | Shibata et al. | 340/572.7 |
| 2006/0049714 A1 | 3/2006 | Liu et al. | |
| 2007/0107522 A1 | 5/2007 | Oikawa et al. | |

FOREIGN PATENT DOCUMENTS

| | | |
|---|---|---|
| DE | 102 15 834 A1 | 11/2003 |
| GB | 2 054 850 A | 2/1981 |
| WO | 00/72255 A1 | 11/2000 |
| WO | 2006/057987 A1 | 6/2006 |

OTHER PUBLICATIONS

L. Reindl, et al., "SAW Devices as Wireless Passive Sensors", Ultrasonics Symposium, Nov. 3, 1996, pp. 363-367, vol. 1, IEEE, New York, NY, USA, XP010217902.

* cited by examiner

*Primary Examiner* — Thomas Dougherty
(74) *Attorney, Agent, or Firm* — Baker & Hostetler, LLP

(57) ABSTRACT

A remotely interrogatable passive sensor is provided. The sensor comprises an antenna and at least one surface wave resonator including a transducer with inter-digitated electrodes with two ports on the surface of a piezoelectric substrate, in which the antenna comprises conducting elements connected to the two ports and integrated onto said piezoelectric substrate. Advantageously, the antenna elements are folded on the substrate to enhance compactness. The passive sensor can be used for medical applications such as tissue analysis or arterial pressure measurement.

18 Claims, 9 Drawing Sheets

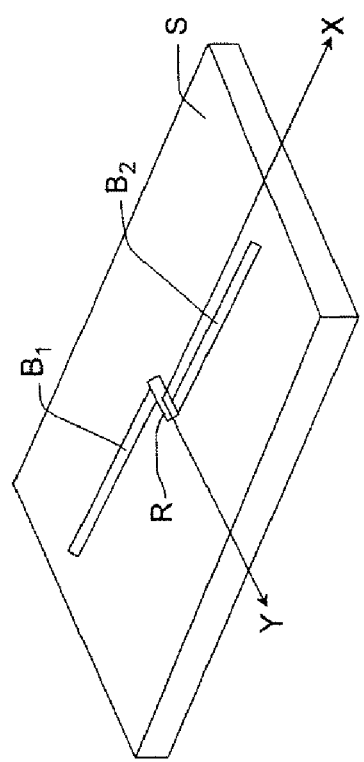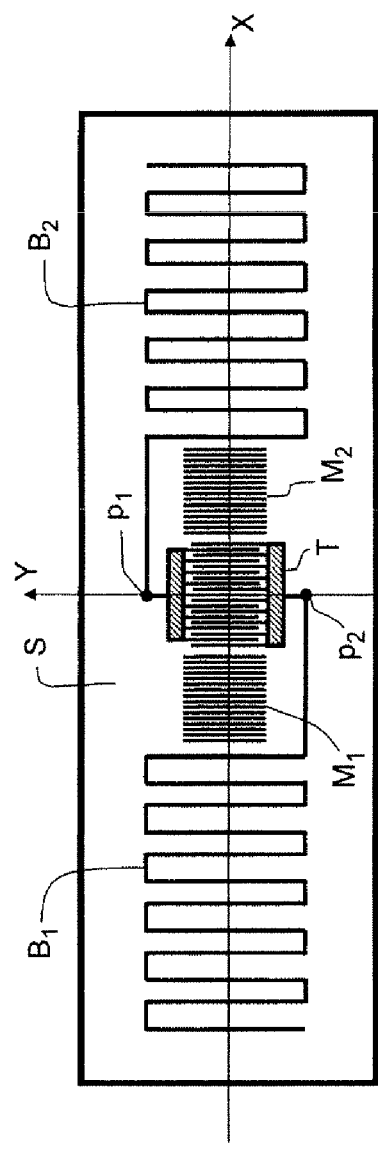

SURFACE-WAVE PASSIVE SENSOR INCLUDING AN INTEGRATED ANTENNA, AND MEDICAL APPLICATIONS USING SUCH A TYPE OF PASSIVE SENSOR

CROSS-REFERENCE TO RELATED APPLICATIONS

This application is a National Stage of International Patent Application No. PCT/EP2008/067944, filed on Dec. 18, 2008, which claims priority to foreign Patent Application No. FR 07 60270, filed on Dec. 21, 2007, the disclosures of which are incorporated herein by reference in their entirety.

FIELD OF THE INVENTION

The invention relates to a novel type of passive sensor remotely interrogatable via a coupled antenna and advantageously usable in any type of organic medium exhibiting a dielectric permittivity appreciably greater than that in vacuum. Typically of relevance are biological media for which it is particularly beneficial to have available sensors making it possible to perform invasive measurements and the analysis of the tissues of the human body or to perform measurements of arterial pressure, etc.

BACKGROUND OF THE INVENTION

Typically, the high dielectric permittivity of biological media (of the order of 53 for muscle at 2.45 GHz) makes it possible to design passive sensors, notably surface wave passive sensors, operating at reduced electromagnetic wavelengths and thereby permitting likewise reduced antenna dimensions.

Currently, it has already been proposed that surface wave passive sensors of "surface acoustic wave" type, designated by the acronym SAW, be used for this type of application. The principle of this type of sensor is described hereinafter. This may according to the known art pertain notably to temperature and/or pressure sensors.

In a general manner, a complete system is composed of an interrogation unit (itself consisting of an emitter part and of a receiver part, i.e. E/R) $S_{E/R}$ and of a temperature and/or pressure sensor of the surface acoustic wave SAW type, as illustrated in FIG. 1. The SAW device is of resonator type, thereby making it possible to achieve structures of reduced size. The interrogation system as well as the SAW sensor are furnished respectively with antennas $A_1$ and $A_2$, suitably matched to the working frequency band (ISM bands 433 MHz, 868 MHz, 2.45 GHz, etc.) or to any other unoccupied frequency band of use, thereby making it possible to perform wireless interrogation of the sensor. The mode of interrogation is as follows:

The emitter of the interrogation system dispatches an interrogation signal (temporal pulse of a carrier in the ISM band, emission time slot) toward the antenna associated with the SAW resonator. Through the piezoelectric coupling effect, the incident electromagnetic wave is transformed into an acoustic wave propagating at the surface of the substrate.

If the emission signal exhibits a resonant frequency sufficiently close to the natural frequency of the SAW resonator, the latter starts resonating on passing through a charging period. Steady state oscillations are then set up at the natural resonant frequency of the SAW device. This resonant frequency is proportional to the speed of the surface wave in the resonant cavity which itself depends on the temperature and the stresses seen by the resonator.

The sensor used is based on a structure of resonator type as illustrated in FIG. 2. The resonator is composed of a transducer with inter-digitated combs (transducer at the center of the structure). The transducer consists of an alternation of electrodes, which are repeated with a certain periodicity, called the metallization period, deposited on a piezoelectric substrate (typically made of quartz). The electrodes, advantageously of aluminum, (possibly made by photolithography) have a low thickness that can go from a few hundred Angströms typically up to a micron, without this being restrictive.

The transducer furthermore comprises two ports $p_1$ and $p_2$ as illustrated in FIG. 2, possibly being linked to an antenna or to its radiating strands. The field lines thus created between two different polarity electrodes give rise (by virtue of the linear nature of the piezoelectric effect) to a surface acoustic wave in the zone of overlap of the electrodes for an electrical excitation at the resonant frequency of the device (given to a first approximation by the phase speed of the surface wave under the array of electrodes, divided by the electrical period of the transducer).

The sensor transmits to the antenna a signal at its resonant frequency which carries information possibly related to the pressure or temperature phenomenon. The resulting radiofrequency signal is radiated and transmitted to the receiver.

During the reception time slot, the receiver of the interrogation system detects all or part of the radiofrequency signal re-emitted (corresponding to a damped oscillation) and extracts therefrom the sought-after pressure and temperature information via suitable signal processing making it possible to identify the resonant frequency of the surface wave device.

The transducer is a bi-directional structure, that is to say the amount of energy which propagates toward the right and toward the left has the same intensity. Electrodes which have a reflector role are advantageously disposed on either side of the transducer. Each reflector partially reflects the energy emitted by the transducer. These reflectors or mirrors operate at the Bragg condition for which the mechanical period of the array corresponds to half the wavelength of the acoustic propagation.

If the number of reflectors is multiplied, a total reflection is created, thus creating a resonant cavity which is characterized by its resonant frequency. The frequency which depends on the temperature and stresses (i.e. pressure) seen by the resonator is the parameter measured by the interrogation system. The pressure and the temperature are calculated on the basis of this measurement.

According to the state of the art, pressure and temperature sensors are generally based on a differential structure using three SAW resonators, as illustrated in FIG. 3. On account of the low bandwidth allocated for ISM communications, the resonators are made on quartz on cuts for which the thermal drift of the frequency is reduced. These three resonators are enclosed in a cavity with a certain reference pressure.

The first resonator R using the customary propagation axis X is situated in a stress-free zone. The resonator T also located in a stress-free zone is tilted by a certain angle with respect to the X axis. The fact of tilting the resonator T affords the latter a different sensitivity to that of the resonator R in relation to temperature. The frequency difference between the resonators R and T consequently makes it possible to obtain information related solely to temperature independent of the state of the pressure exerted on the lower face of the device.

The resonator P using the propagation axis X like the resonator R is located in a zone where the stresses are appreciably higher than the resonators R and T so that, when an overpressure (with respect to the pressure of the cavity) is exerted on the sensor, the frequency of the resonator P varies proportionately. FIGS. 4 and 5 present two exemplary embodiments.

More precisely, in the first case illustrated in FIG. 4, the pressure of the external medium F is transmitted via a stamped metal cap Cm in contact with a zone of the quartz substrate S. The microchip bears on two projecting rectilinear metal parts $p_{ms}$, so that only the resonator P is subjected to significant stresses. The whole is positioned on a printed circuit Ci and connected via wire links $L_f$. The reference SAW designates in a common manner the three resonators R, T, P.

In the second case illustrated in FIG. 5, the pressure of the external medium is applied directly to the quartz substrate which has been thinned locally in the zone where the resonator P is situated. The other two resonators are located in a non-thinned zone bonded onto a base E and therefore less sensitive to the effects of stresses induced by the application of hydrostatic pressure to the component as a whole.

In both these cases, the resonator P uses the same direction of propagation as the resonator R (same dependence of the frequency as a function of temperature). The frequency difference between the resonators P and R consequently makes it possible to obtain information solely related to the pressure exerted independent of temperature. The base E makes it possible to position all of the resonators at the level of the printed circuit Ci.

In most industrial and automobile applications, SAW pressure and temperature sensors based on the principles described above are satisfactory in particular from the standpoint of bulk.

For certain applications, in particular for the medical sector, the size of the sensor is a determining element, in particular for implantable solutions. Even though promising trials have been performed at low frequency, it is imperative to further reduce the size of the sensor and that of the antenna associated with it.

It is in this context that the present invention proposes a novel type of passive sensor of low bulk.

SUMMARY OF THE INVENTION

More precisely, the subject of the present invention is a remotely interrogatable passive sensor comprising an antenna and at least one surface wave resonator comprising a transducer with inter-digitated electrodes with two ports on the surface of a piezoelectric substrate, characterized in that the antenna consists of a dipole consisting of two conducting strands connected to the two ports of the transducer and integrated onto said piezoelectric substrate, the passive sensor furthermore comprising a short-circuit or adjustment conducting element linking the two conducting strands at two connection points belonging to said strands.

According to the invention, the dimensions of antennas that can be used (of the order of a few centimeters) make it possible to be able to integrate the latter directly onto the substrate, generally made of quartz. Thus, the original miniaturization techniques applied make it possible to reduce these dimensions to a total bulk of a few millimeters. Their fabrication is carried out at the same time as the resonator of "surface acoustic wave" type designated by the acronym SAW, thereby making it possible in particular to appreciably simplify the sensor's fabrication method.

According to a variant of the invention, the length of the conducting strands of the antenna is of the order of $\lambda_{g/4} = \lambda_O/4\sqrt{\in_r} = c/(4f_O\sqrt{\in_r})$, with $\lambda_g$ the guided wavelength in the material, $\lambda_O$ being the wavelength of the electromagnetic signal in vacuum associated with the resonant frequency of the resonator and $\in_r$ being to a first approximation the ambient mean dielectric permittivity.

According to a variant of the invention, the conducting strands of the antennas are folded or wound so as to decrease the total bulk of the structure.

Advantageously, the folding can consist of a meandering structure or a structure of serpentine type.

According to a variant of the invention, the passive sensor furthermore comprises a short-circuit conducting element connecting the two conducting strands of the antenna at two connection points.

In a general manner, the transducer exhibits an axis of propagation of the surface acoustic waves and an axis perpendicular to said propagation axis, said propagation axis separating the plane of the substrate into two first half-planes, the perpendicular axis separating the plane of the substrate into two second half-planes.

According to a variant of the invention, said connection points are situated in the same first half-plane.

According to a variant of the invention, the radiating element is short-circuited by a conducting bridge, the connection points being situated in different first half-planes.

According to a variant of the invention, the connection points are situated in different second half-planes.

According to a variant of the invention, the connection points are situated in one and the same second half-plane.

According to a variant of the invention, the short-circuit element exhibits a width that is less than or equal to, or greater than, that of the conducting strands.

According to a variant of the invention, the sensor is characterized in that it is a pressure sensor comprising at least two resonators, each resonator being coupled to one or more integrated antennas.

According to a variant of the invention, the sensor is characterized in that it is a pressure and temperature sensor, comprising three resonators, each resonator being coupled to one or more integrated antennas.

According to a variant of the invention, the passive sensor comprises a stack of several substrates each comprising a resonator and an integrated antenna, produced by way of peripheral shims.

Advantageously, the peripheral shims are of glass paste type.

According to a variant of the invention, the pressure sensitive resonator is in the upper position in the stack and in head-to-tail position with respect to the reference resonator.

The subject of the invention is also the use of a passive sensor according to the invention, characterized in that the passive sensor is introduced into a part of a live body, so as to analyze said part, the physical characteristics of the integrated antenna (such as dimension, band of use, impedance, directivity, gain, etc.) being defined so as to be able to perform the analysis of said part of the live body.

The propagation medium can then consist predominantly of tissues, possibly skin, lungs, muscles, bones, etc.

Finally, the subject of the invention is the use of a passive sensor according to the invention to measure the arterial pressure of a living being.

BRIEF DESCRIPTION OF THE DRAWINGS

The invention will be better understood and other advantages will become apparent on reading the non-limiting description which follows and by virtue of the appended figures among which:

FIG. 6 illustrates a first exemplary passive sensor according to the invention comprising a resonator linked to an antenna;

FIG. 7 illustrates a second exemplary passive sensor according to the invention comprising folded antenna strands;

DETAILED DESCRIPTION

In a general manner, the passive sensor of the invention comprises at least one resonator R linked to an emission antenna on the surface of a piezoelectric substrate S as illustrated in FIG. 6. The antenna can typically be a dipole exhibiting two radiating strands $B_1$ and $B_2$. These two radiating strands are realized by conducting metallizations deposited on the substrate S, typically made of quartz, which also receives the surface wave resonator R. The dimension of an antenna element is around $\lambda_g/4$ or any multiple of this value, $\lambda_g$ being the guided wavelength in the material. This length is calculated approximately by the relation:

$$\lambda_g = \lambda_O/\sqrt{\in_r} = c/(f_O\sqrt{\in_r})$$

with $\lambda_O$ the wavelength of the electromagnetic signal in vacuum associated with the resonant frequency of the resonator, $\in_r$ to a first approximation the ambient mean permittivity dependent on the carrier substrate and the environment in which the antenna is immersed.

According to a variant of the invention, to enhance compactness it may be advantageous to fold all the geometric shapes imaginable or to wind the antenna strands as illustrated in FIG. 7 which shows antenna strands $B_1$ and $B_2$ folded in the form of meanders and connected to the ports $p_1$ and $p_2$ of the transducer T inserted between two reflectors $M_1$ and $M_2$, the whole forming the surface wave resonator. It should be noted that the folding could equally well be carried out in the form of a serpentine.

In a general manner, it is important to ensure good impedance matching between the antenna elements and the resonator so as to limit the losses, at the operating frequency of the resonator.

In a general manner, a Smith chart represents a graphical calculation tool allowing the representation of the complex quantities seen on a transmission line. These quantities are generally a complex reflection coefficient or transmission coefficient, whose frequency evolution is plotted in a polar representation. Presenting a reflection coefficient in the form of a Smith chart makes it possible to ascertain the complex value of the corresponding impedance as a function of frequency, that is to say both the real part $R_z$ and also the imaginary part $X_z$ of the input impedance of the radiating element expressed in the form $Z=R_z+jX_z$, by reading these values directly off the chart. This chart also makes it possible to be aware of the quality of the matching of the antenna to the sensor. At the working frequency considered, the antenna/sensor power transfer or the converse is all the better the closer the impedance locus to the center of the chart.

Figure 1:
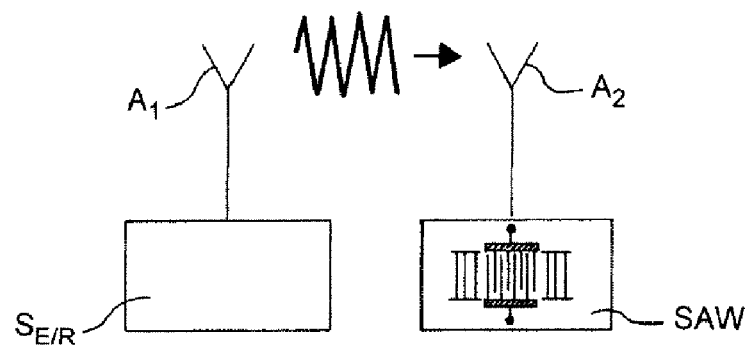
FIG. 1 illustrates a sensor comprising an interrogation unit and a resonator of SAW type.
Figure 2:
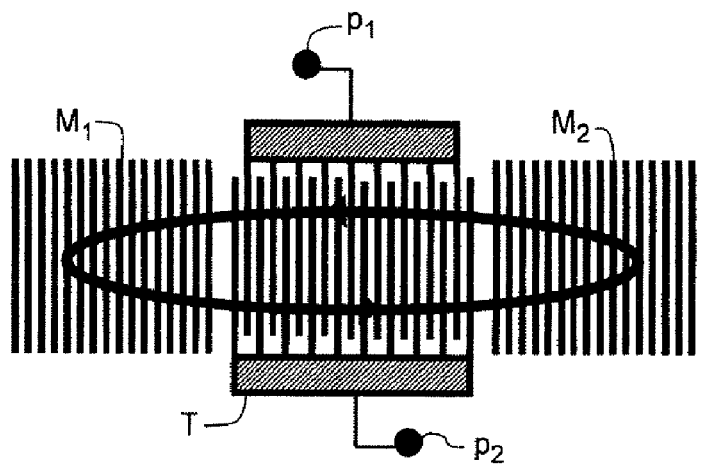
FIG. 2 illustrates a resonator structure composed of an inter-digitated-comb transducer.
Figure 3:
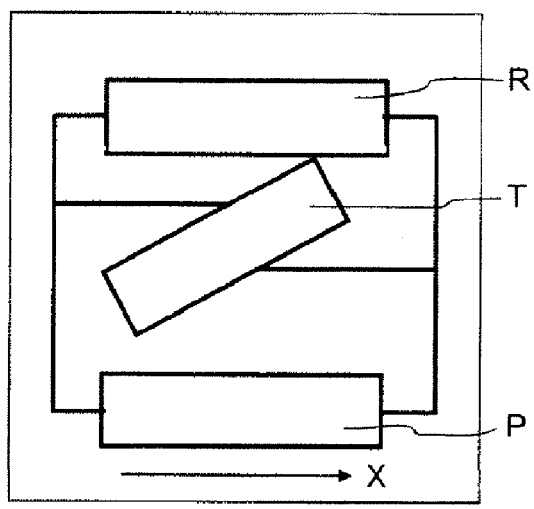
FIG. 3 illustrates an exemplary pressure and temperature sensor according to the known art using three SAW resonators.
Figure 4:
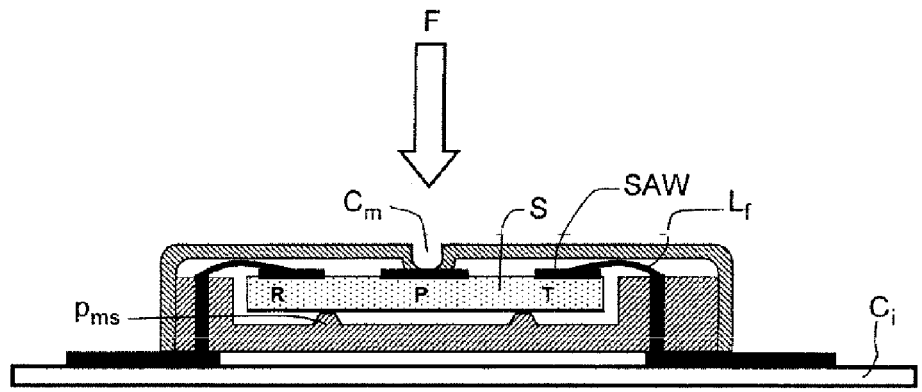
FIG. 4 illustrates a first exemplary embodiment of a temperature and pressure sensor according to the known art.
Figure 5:
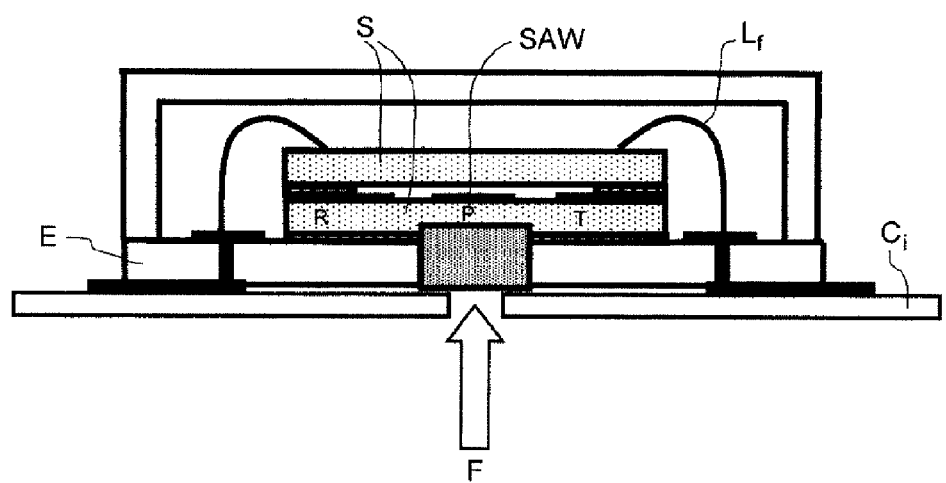
FIG. 5 illustrates a second exemplary embodiment of a temperature and pressure sensor according to the known art.
Figure 8:
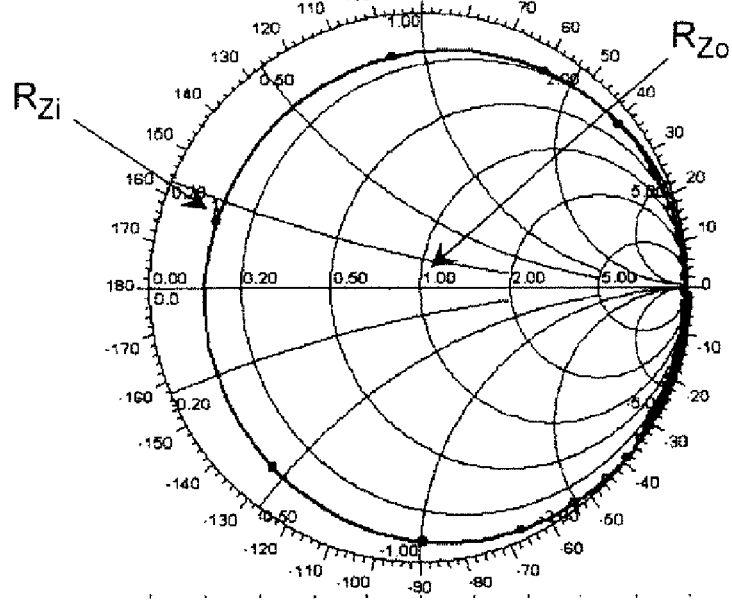
FIG. 8 illustrates on a Smith chart representative of the matching of the antenna through the plot of the coefficient as a function of frequency.

It emerges from FIG. 8 that the impedance matching is achieved when the impedance circle cuts the horizontal axis at the matching point $R_{z0}$ corresponding to the point 1 on the horizontal axis. With an antenna strand configuration such as that illustrated in FIG. 7, it is typically possible to obtain the impedance circle cutting the horizontal axis at the point $R_{zi}$ of the order of 0.1.

Figure 9:
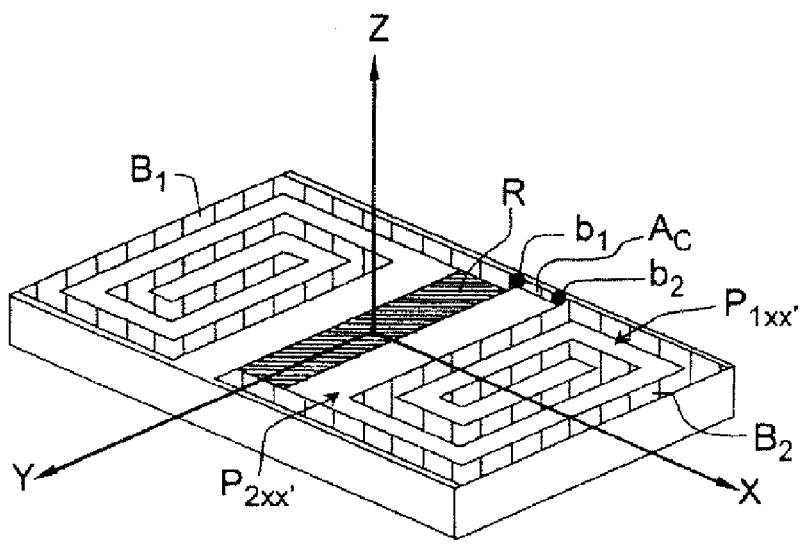
FIG. 9 illustrates a third exemplary passive sensor according to the invention comprising a small secondary conducting strand playing the role of short-circuit element allowing adjustment of the impedance.

According to a variant of the invention, it is proposed that a short-circuit or adjustment element be introduced, making it possible to better ensure the sought-after impedance matching. FIG. 9 illustrates this exemplary passive sensor comprising a small secondary conducting strand playing the role of short-circuit element. According to this configuration, the conducting strands $B_1$ and $B_2$ are thus linked by a conducting element $A_c$. More precisely, the two conducting strands are linked at two points $b_1$ and $b_2$ by the conducting element $A_c$, belonging to one and the same first half-plane $P_{1XX'}$ if it is considered that the axis of propagation of the acoustic waves within the resonator cuts the plane of the substrate in two first half-planes $P_{1XX'}$ and $P_{2XX'}$.

Figure 10:
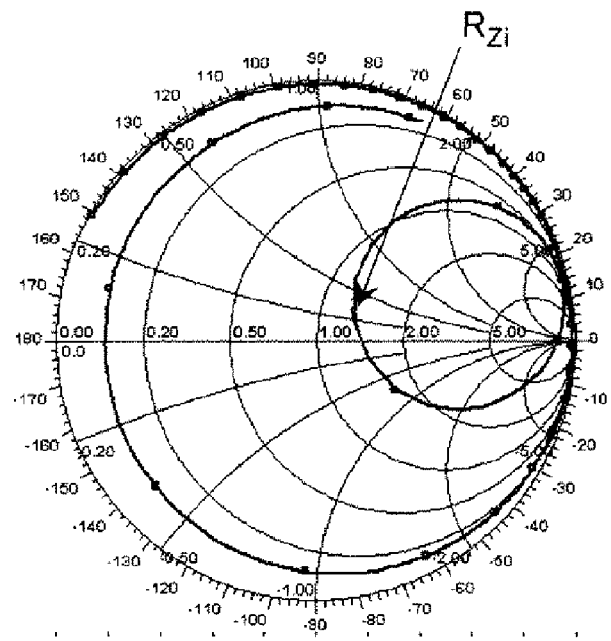
FIG. 10 illustrates a Smith chart representative of the impedance matching in the case of the passive sensor illustrated in FIG. 9.

FIG. 10 illustrates the associated Smith chart showing that it is possible to reach the horizontal point 1 by virtue of the introduction of this short-circuit element positioned in such a way as to electrically link the two radiating strands at a particular point, thereby making it possible to choose in a precise manner the impedance of the antenna presented to the sensor.

This choice makes it possible to attain near perfect matching of the impedances, thereby improving the transfer of power between SAW sensor and antenna, and generally the link budget. An "anti-resonance" phenomenon is thus created, which makes it possible to decrease the value of the impedance at the frequency considered, thereby bringing the impedance locus much closer to the center of the chart shown in FIG. 10. The matching and therefore the power transfer are thus improved.

Figure 11:
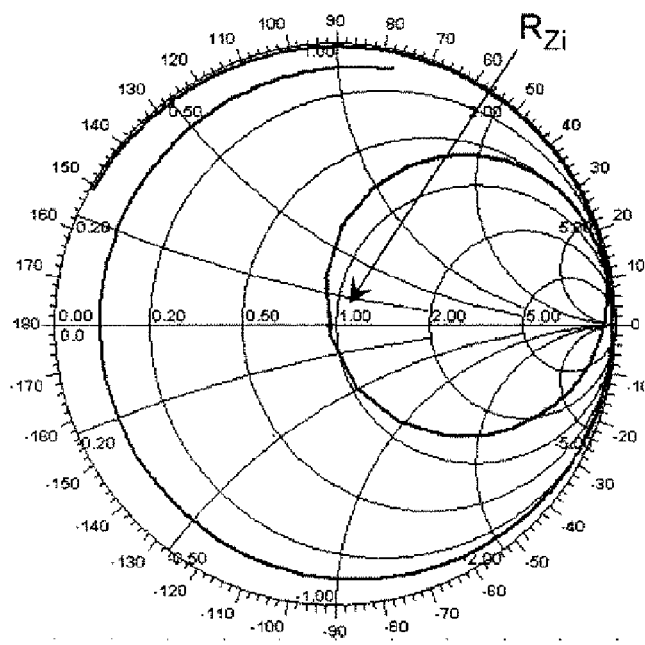
FIG. 11 illustrates a Smith chart representative of the impedance matching in the case of the passive sensor integrating a short-circuit element of larger width than that of the conducting strands of the antenna.

In the previous configuration, the short-circuit or adjustment element exhibits a smaller width than that of the constituent conducting strands of the antenna elements. Nonetheless, it is also possible to alter the width of the short-circuit element so as to adjust the impedance matching in a different manner, notably by widening this short-circuit element. It is observed in FIG. 11 that the operating point obtained is very near the optimal matching point.

The metal linking element $A_c$ therefore plays the role of a tuning element that is particularly well suited to the problem of adjusting the real part of the input impedance of the structure and makes it possible to perfectly match a radiating element to a resonator exhibiting a purely real impedance. Nonetheless, SAW resonators exhibiting a capacitive impedance, the optimization of the matching of the radiating element can also be effected by adjusting the imaginary part.

Figure 12:
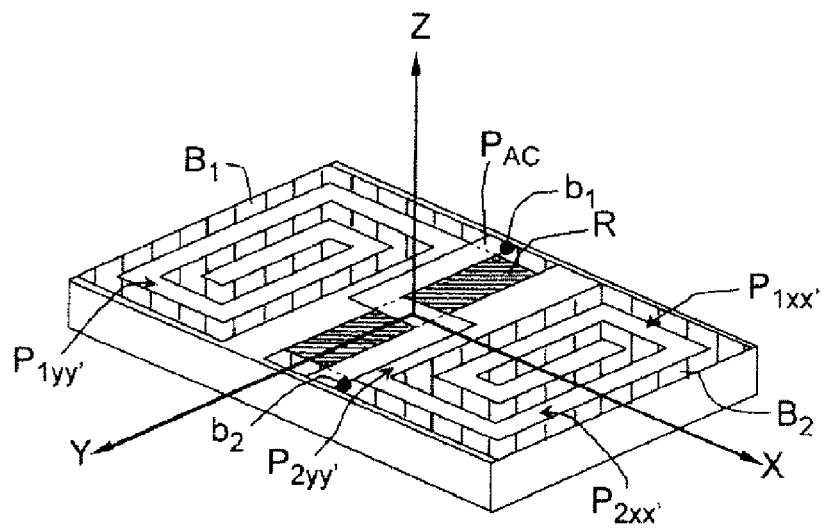
FIG. 12 illustrates a fourth exemplary passive sensor according to the invention comprising a conducting bridge linking the two antenna strands.

This is why, according to another variant of the invention, it is proposed that the secondary element Ae be replaced with an S-shaped metal bridge $P_{Ae}$, the bridge linking the two strands of the dipole at the level of the output of the SAW sensor as illustrated in FIG. 12. More precisely, the two conducting strands are linked at two points $b_1$ and $b_2$ belonging in this case to two different first planes $P_{1XX'}$ and $P_{2XX''}$. By considering the axis YY' perpendicular to the propagation axis XX', it is apparent moreover that the points $b_1$ and $b_2$ also belong to two different second half-planes: $P_{1YY'}$ and $P_{2YY''}$.

Figure 13:
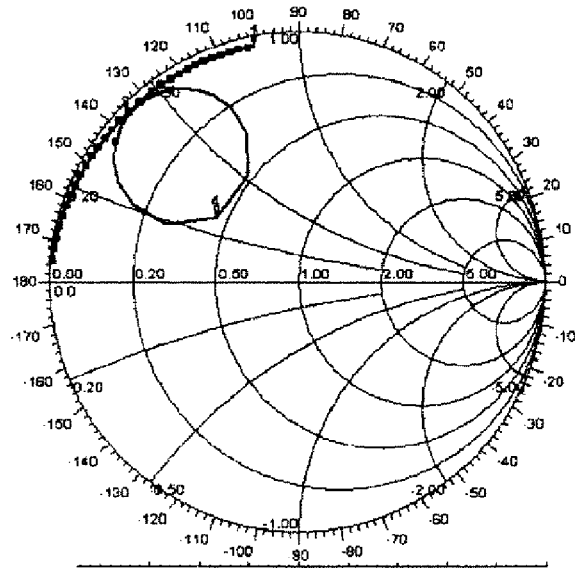
FIG. 13 illustrates the Smith chart representative of the impedance matching in the case of the passive sensor illustrated in FIG. 12.
Figure 14:
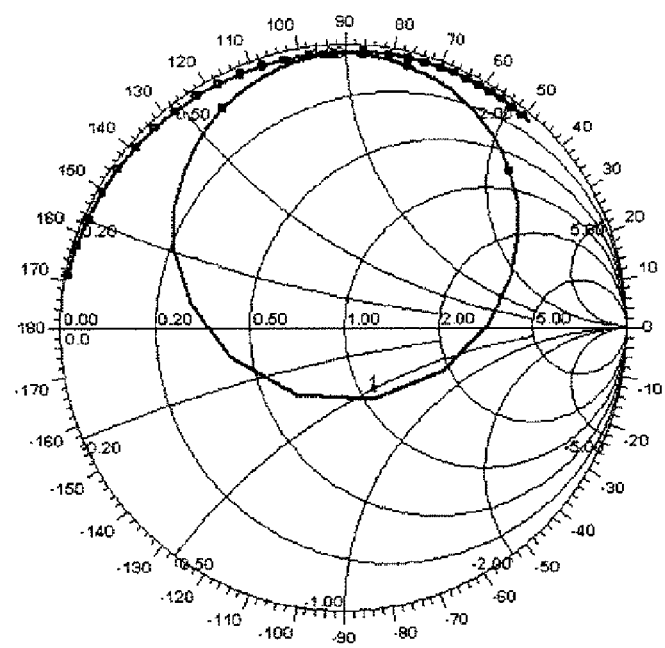
FIG. 14 illustrates the Smith chart representative of the impedance matching in the case of the passive sensor integrating a conducting bridge of lesser width than that of the conducting strands of the antenna.
Figure 15:
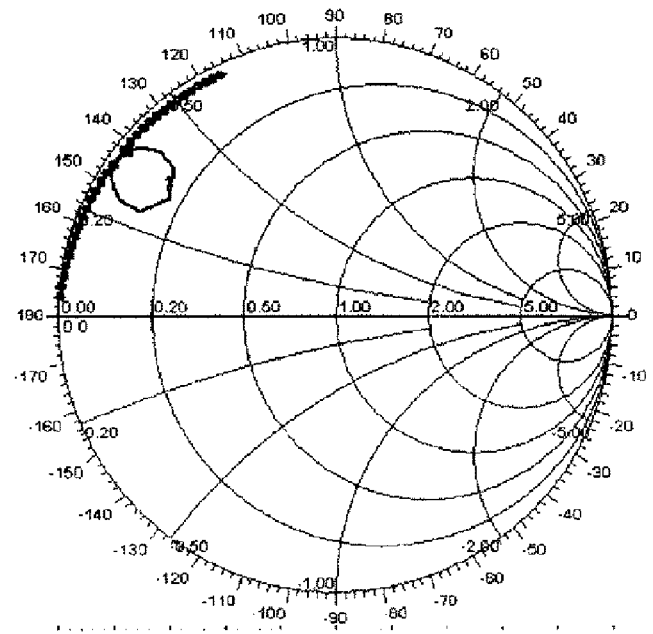
FIG. 15 illustrates the Smith chart representative of the impedance matching in the case of the passive sensor integrating a conducting bridge of greater width than that of the conducting strands of the antenna.

It may be observed in FIG. 13 that a rotation of the impedance locus on the Smith chart is thus brought about. This rotation conveys an appreciable modification of the imaginary part of the impedance of the element. This metal linking element therefore plays the role of a tuning element also allowing adjustment of the impedance behavior from the point of view of the imaginary part. It is also possible to alter the width of this bridge so as to more finely adjust the impedance matching between the antenna and the SAW sensor. FIGS. 14 and 15 illustrate respectively the Smith charts obtained with conducting bridges of respectively smaller and greater width than that of the conducting strands of the antenna.

It is observed in FIG. 14 that a clockwise rotation of the impedance locus on the Smith chart is thus brought about, accompanied by an opening up of the loop. This rotation conveys an appreciable modification of the imaginary part of the impedance of the element.

It is observed in FIG. 15 that an anti-clockwise rotation of the impedance locus on the Smith chart is thus brought about, accompanied by a decrease in the loop. This rotation conveys an appreciable modification of the imaginary part of the impedance of the element.

This metal linking element therefore plays the role of a tuning element allowing adjustment of the imaginary part of the input impedance of the radiating element which is connected to the sensor.

However, this metal bridge which in this way links the two strands of the radiating element may require the use of an intermediate layer, because its plot passes through the place where the SAW resonator is situated.

Figure 16:
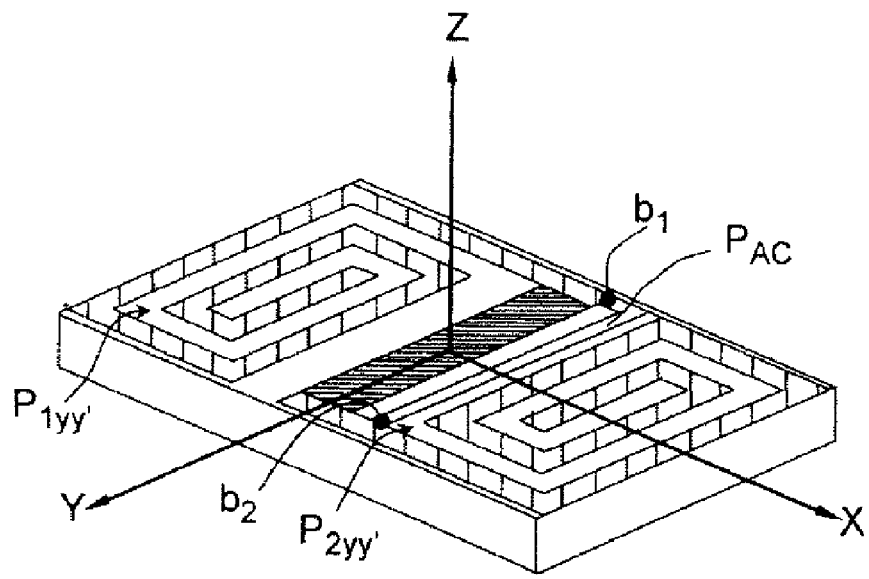
FIG. 16 illustrates a fifth exemplary passive sensor according to the invention comprising a conducting bridge linking the two antenna strands situated in one and the same half-plane.

A possible solution for circumventing such a constraint can reside in transferring this bridge to just one side of the resonator as illustrated in FIG. 16. The connection points, the width and the shape of this new bridge constitute the new adjustment parameters. According to this configuration, the points $b_1$ and $b_2$ then belong to one and the same second half-plane, in this instance as represented in FIG. 16 to the second half-plane $P_{2YY''}$.

Figure 17:
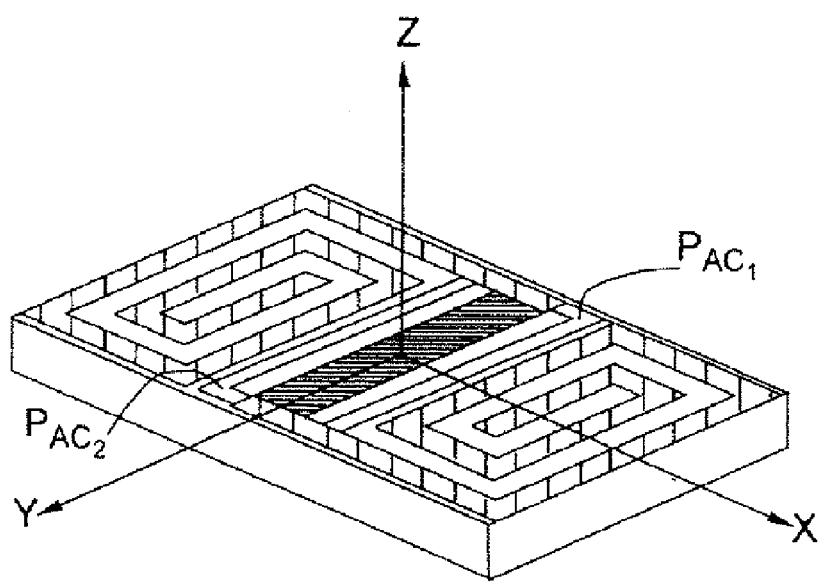
FIG. 17 illustrates a sixth exemplary passive sensor according to the invention comprising two conducting bridges linking the two antenna strands.

Lower values can also be obtained by placing two bridges of this type in parallel, illustrated in FIG. 17 which shows an example in which the two antenna strands are connected via two conducting bridges $P_{Ac1}$ and $P_{Ac2}$.

In a general manner, the present invention proposes an original structure of passive sensor associated with miniature antenna elements. The compactness of passive sensors such as these opens the way for medical applications, in an invasive or non-invasive manner.

Figure 18:
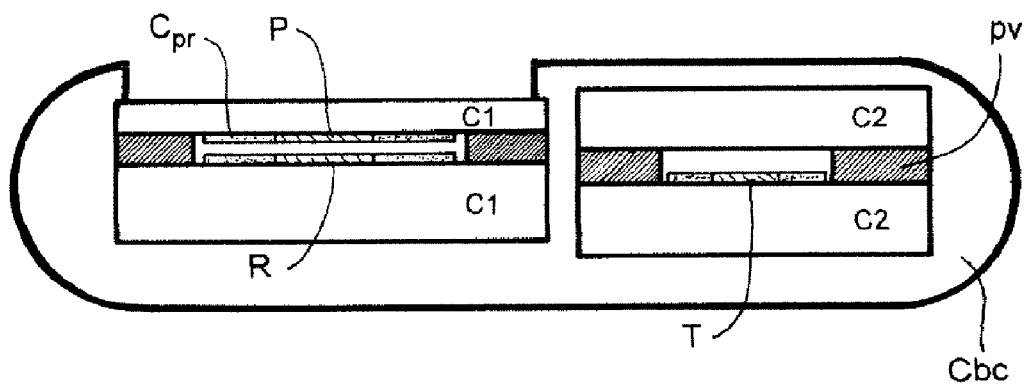
FIG. 18 illustrates a first exemplary temperature and pressure sensor according to the invention.

FIG. 18 illustrates in this respect an exemplary pressure sensor with integrated antenna on the SAW microchip, exhibiting a decisive advantage since it makes it possible to achieve low bulk while guaranteeing complete isolation of the connections in relation to the external medium.

The SAW sensor consists of an all-quartz package shrouded, except for its pressure sensitive face, in a biocompatible material exhibiting a shape devoid of sharp edges.

The all-quartz package is composed of the set of SAW resonators. This can be obtained after cutting a set of two slices which were previously bonded via a glass sealing of glass paste type, gp, exhibiting thermal expansion properties as similar as possible to quartz, the whole being tied in a bio-compatible wrapping $C_{bc}$ (Xantar for example).

The first microchip used as cap of the all-quartz package (cut $C_1$) exhibits at the minimum an SAW resonator corresponding to the resonator P but can receive two of them in the case of a differential structure. The cap is thinned (to thicknesses possibly reaching 50 µm) from a wafer of standard thickness (350 µm for example) so as to obtain the sensitivity to pressure desired in a cavity $C_{pr}$ with a reference pressure. The antenna consists of metallizations deposited directly on the quartz substrate with the same photolithography method as that used for the fabrication of the resonators. The second microchip used as base of the all-quartz package (also cut $C_1$) exhibits a resonator R. This resonator is isolated mechanically from the mechanical stresses related to the external pressure in particular by virtue of the use of a non-thinned wafer. The pressure information is obtained by differential measurement between the resonators P and R.

The third resonator T is made on a separate substrate and accommodated inside an all-quartz cavity. In the case of a device operating at 2.45 GHz, it is possible to use a quartz cut $C_2$ different from the cut $C_1$ so as to obtain a different frequency sensitivity as a function of temperature. For a device operating at a frequency less than 1 GHz, the third resonator can use the same quartz cut $C_1$ and the different temperature sensitivity is obtained by varying the axis of propagation of the resonator T with respect to the resonators R and P. The temperature information for its part is obtained by differential measurement between the resonators T and R.

The above configurations are given by way of example and it should be noted in general that currently it may be advantageous to make 2.45 GHz devices with transverse shear waves known by the name STW having regard to their high propagation speed, allowing a gain in resonant frequency of 60% with respect to the maximum achievable with Rayleigh waves for a given technology. In this case, without being restrictive to this particular situation, a differential in temperature sensitivity is obtained (between the resonators R and P on one side and T on the other) by changing the material cut of the resonator T. The latter is then organically separated from the other resonators since it is made on a different substrate. In the case where the technology so permits, the use of Rayleigh waves for such an application makes it possible equally well to utilize such an approach or that described previously consisting in integrating the three resonant elements onto one and the same substrate.

Thus and according to the invention, the configuration of the sensor with integrated antenna coupled to each of the resonators exhibits a certain number of advantages:

- in the case of this configuration, each resonator is connected to its own antenna in contradistinction to the existing configurations where the two resonators are connected in parallel with the antenna. This results in an increase in the coupling coefficient (defined as the ratio of the electro-acoustic capacitance to the static capacitance of the resonators);
- the photolithography technology used for producing the antennas being the same as that used for producing the SAW, it is possible to produce folds with a large number of degrees of freedom making it possible to achieve significant optimizations of size. The method for fabricating the sensor (resonator plus antenna) is thereby naturally simplified;
- the technology makes it possible to circumvent potential problems related to the external corrosive medium (biological medium for example) because it is not necessary to make contacts external to the sensor for the antenna transfer.

Figure 19:
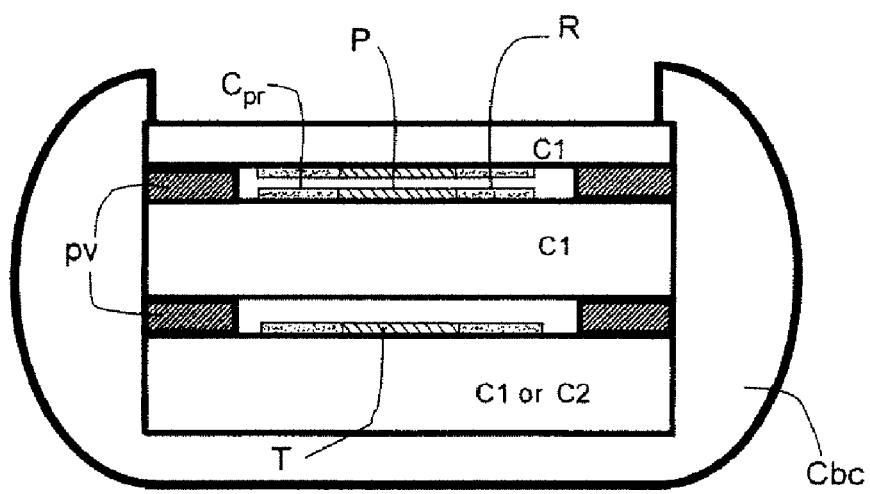
FIG. 19 illustrates a more compact second exemplary temperature and pressure sensor.

FIG. 19 presents a variant of the pressure and temperature sensor. The sensor is composed of three SAW devices linked together by a method for sealing quartz slices. The first SAW device comprising the resonator at the pressure P is thinned down. Vertical stacking of the various resonators makes it possible to achieve minimum bulk. Each resonator is furnished with an individual antenna according to the principles described previously. The stack is made between the three substrates by virtue of peripheral shims made of glass paste gp.

The rise in frequency leads naturally to this decrease in size. The sensor which is the subject of the present invention uses an operating frequency of 2.45 GHz. In addition to the natural reduction in the size of the antennas to the scale of the wavelength, working at 2.45 GHz makes it possible to benefit from an ISM band that is relatively six times as large as at 433 MHz for example. The high dielectric permittivity of biological media (of the order of 53 for muscle at 2.45 GHz) allows the wavelength and consequently the dimensions of the antennas to be reduced still further. The dimensions of antennas thus obtained (of the order of a few centimeters) make it possible to be able to integrate them directly onto the quartz substrate. The original miniaturization techniques applied therefore make it possible to reduce these dimensions to a total bulk of a few millimeters. They are therefore fabricated at the same time as the SAW resonator thereby making it possible in particular to appreciably simplify the method for fabricating the sensor.

What is claimed is:

1. A remotely interrogatable passive sensor, comprising:
   - at least one surface wave resonator including a transducer with inter-digitated electrodes with two ports on the surface of a piezoelectric substrate;
   - an antenna including a dipole having two conducting strands connected to the two ports of the transducer and integrated onto said piezoelectric substrate; and
   - a short-circuit or adjustment conducting element linking the two conducting strands at two connection points belonging to said strands.

2. The passive sensor as claimed in claim 1, wherein the length of the conducting strands is of the order of $\lambda_{g/4} = \lambda_0/4\sqrt{\in_r}$, $\lambda_0$ being the wavelength associated with the resonant frequency of the resonator in vacuum and $\in_r$ being to a first approximation the ambient mean dielectric permittivity.

3. The passive sensor as claimed in claim 1, wherein the conducting strands comprise a folding of the strands so as to decrease the total length of the structure.

4. The passive sensor as claimed in claim 3, wherein the folding is of meander or serpentine type.

5. The passive sensor as claimed in claim 1, wherein the transducer exhibits an axis of propagation of the surface acoustic waves and an axis perpendicular to said propagation axis, said propagation axis separating the plane of the substrate into two first half-planes, the perpendicular axis separating the plane of the substrate into two second half-planes.

6. The passive sensor as claimed in claim 5, wherein said connection points are situated in the same first half-plane.

7. The passive sensor as claimed in claim 5, wherein the short-circuit conducting element is a conducting bridge, the connection points being situated in different first half-planes.

8. The passive sensor as claimed in claim 5, wherein the connection points are situated in one and the same second half-plane.

9. The passive sensor as claimed in claim 5, wherein the connection points are situated in different second half-planes.

10. The passive sensor as claimed in claim 1, wherein the short-circuit conducting element exhibits a width that is less than or equal to that of the conducting strands.

11. The passive sensor as claimed in claim 4, wherein the short-circuit conducting element exhibits a width that is greater than that of the conducting strands.

12. The passive sensor as claimed in claim 1, wherein the passive sensor is a pressure sensor comprising at least two resonators, each resonator being coupled to an integrated antenna.

13. The passive sensor as claimed in claim 1, wherein the passive sensor is a pressure and temperature sensor, comprising a first reference resonator, a second resonator for measuring the temperature and a third pressure sensitive resonator, each resonator being coupled to an integrated antenna.

14. The passive sensor as claimed in claim 1, wherein the passive sensor is a pressure and/or temperature sensor, comprising a stack of several substrates each comprising a resonator and an integrated antenna, produced by way of peripheral shims.

15. The passive sensor as claimed in claim 14, wherein the peripheral shims are of glass paste (gp) type.

16. The passive sensor as claimed in claim 14, wherein the pressure sensitive resonator is in the upper position in the stack and in head-to-tail position with respect to a reference resonator.

17. The use of the passive sensor as claimed in claim 1 to analyze tissues such as skin, lungs, muscles, bone.

18. The use of the passive sensor as claimed in claim 1 to measure an arterial pressure.

* * * * *